United States Patent
Pope et al.

(10) Patent No.: US 12,306,065 B2
(45) Date of Patent: May 20, 2025

(54) CONTAINER LEAKAGE DETECTION USING THERMAL IMAGING

(71) Applicant: Institut National D'Optique, Quebec (CA)

(72) Inventors: Timothy Pope, Quebec (CA); Samuel Ouellet, Quebec (CA); Robert Brown, Quebec (CA)

(73) Assignee: Institut National D'Optique, Quebec (CA)

( * ) Notice: Subject to any disclaimer, the term of this patent is extended or adjusted under 35 U.S.C. 154(b) by 470 days.

(21) Appl. No.: 17/771,867

(22) PCT Filed: Oct. 23, 2020

(86) PCT No.: PCT/CA2020/051425
§ 371 (c)(1),
(2) Date: Apr. 26, 2022

(87) PCT Pub. No.: WO2021/081628
PCT Pub. Date: May 6, 2021

(65) Prior Publication Data
US 2022/0390313 A1 Dec. 8, 2022

Related U.S. Application Data

(60) Provisional application No. 62/929,155, filed on Nov. 1, 2019.

(51) Int. Cl.
*G01M 3/00* (2006.01)
*G01N 25/72* (2006.01)
(Continued)

(52) U.S. Cl.
CPC ........... *G01M 3/002* (2013.01); *G06T 7/0004* (2013.01); *G06V 10/40* (2022.01);
(Continued)

(58) Field of Classification Search
CPC ............ G01M 3/002; G01J 2005/0077; G01N 25/72; G01N 21/8851; G06V 10/143; G06V 10/40; G06T 7/0004
See application file for complete search history.

(56) References Cited

U.S. PATENT DOCUMENTS

| | | | |
|---|---|---|---|
| 5,187,368 | A | 2/1993 | Galante et al. |
| 8,426,813 | B2 | 4/2013 | Furry |

(Continued)

FOREIGN PATENT DOCUMENTS

| | | |
|---|---|---|
| DE | 19723799 | 12/1998 |
| DE | 19723799 A1 | 12/1998 |

(Continued)

OTHER PUBLICATIONS

European Search Report in related EP Application 20882908.5 dated Oct. 30, 2023, 7 pages.

(Continued)

*Primary Examiner* — Randy W Gibson
(74) *Attorney, Agent, or Firm* — Hovey Williams LLP

(57) ABSTRACT

Methods and systems for detecting container leakage using thermal imaging, for example, infrared imaging, are disclosed. A method may include a step of sensing thermal radiation emanating from a scene encompassing a liquid-holding container. For example, the container may be an intravenous fluid bag. The method may also include a step of generating a thermal image of the scene based on the sensed thermal radiation and a step of analyzing the thermal image by assessing whether the thermal image includes a thermal feature indicative of the presence of leaked liquid outside the container to determine whether a leak exists in the container. In some embodiments, the container may be enclosed in an overwrap. In such a case, the assessed thermal feature may be indicative of liquid being present in an (Continued)

interstitial volume defined between the container and the overwrap.

4 Claims, 10 Drawing Sheets

(51) Int. Cl.
| | | |
|---|---|---|
| | *G06T 7/00* | (2017.01) |
| | *G06V 10/40* | (2022.01) |
| | *G01J 5/00* | (2022.01) |
| | *G01N 21/88* | (2006.01) |
| | *G06V 10/143* | (2022.01) |

(52) U.S. Cl.
CPC .. *G01J 2005/0077* (2013.01); *G01N 21/8851* (2013.01); *G01N 25/72* (2013.01); *G06V 10/143* (2022.01)

(56) References Cited

U.S. PATENT DOCUMENTS

| | | | | |
|---|---|---|---|---|
| 11,836,908 | B2* | 12/2023 | Weinstein | G06V 10/82 |
| 2005/0286606 | A1* | 12/2005 | Ignatowicz | B29C 65/8261 374/45 |
| 2010/0018941 | A1* | 1/2010 | Kerr | G01M 3/38 215/250 |
| 2018/0341859 | A1* | 11/2018 | Araujo | G06N 20/00 |
| 2024/0054629 | A1* | 2/2024 | Weinstein | G01N 25/72 |

FOREIGN PATENT DOCUMENTS

| | | |
|---|---|---|
| DE | 102011100096 A1 | 10/2012 |
| EP | 2518465 | 10/2012 |
| WO | 2005001409 A2 | 1/2005 |

OTHER PUBLICATIONS

International Search Report and Written Opinion in related application PCT/CA2020/051425 mailed Jan. 11, 2021, 15 pages.

Lampi R.A., et al. Infrared Radiometric Scanning System for Flexible Package Seal Defects, Army Natick Laboratories, Natick, Massachusetts, Dec. 1973, pp. 26.

* cited by examiner

CONTAINER LEAKAGE DETECTION USING THERMAL IMAGING

RELATED APPLICATIONS

The present application is a national stage application under 35 U.S.C. § 371 of International Application No. PCT/CA2020/051425, filed Oct. 23, 2020, and which claims priority to U.S. Provisional Patent Application No. 62/929,155 filed on Nov. 1, 2019. The contents of the above-referenced patent applications are incorporated herein by reference in their entirety.

TECHNICAL FIELD

The technical field generally relates to inspection techniques for detecting leakage in containers, for example, flexible containers such as intravenous fluid bags, and, more particularly, to such techniques using thermal or infrared imaging.

BACKGROUND

Intravenous (IV) fluid bags are used as containers in various medical applications. IV fluid bags are typically packaged in a plastic overwrap, which protects the integrity of the bag by providing an additional barrier against contamination and damage. Leakage of IV fluid bags may sometimes occur if the bag becomes compromised, for example, due to a tear, a puncture, a sealing defect, or another issue. For overwrapped IV fluid bags, leaked fluid may accumulate in the interstitial volume between the bag and its overwrap. Defects in IV fluid bags can arise due to a number of causes including, to name a few, faulty manufacturing and damage incurred during transportation, storage, or handling. Leaking IV fluid bags may result in potential contamination, compromised sterility, patient and medical personnel exposure to hazardous materials contained in the IV solution, and inadequate IV solution concentration or dosage. Leakage of IV fluid bag is undesirable in the medical field and should be detected early on to mitigate its impact.

The discovery of a leaking IV fluid bag downstream in the supply chain may lead to the reinspection of the entire product lot or inventory to which the defective bag belongs. This process may entail significant costs in terms of time and resources. A conventional way of inspecting an IV fluid bag for leakage is to squeeze or push on the bag and visually assess whether some fluid accumulates in the volume between the bag and the overwrap. However, typical IV fluid bag materials and IV fluids tend to exhibit very similar transparencies in the visible region, making visual leakage detection challenging, especially for small leaks. Furthermore, some fluids are packaged in an opaque overwrap, which makes challenging the human or machine vision-based observation of leaks within the overwrap. Therefore, there remains a need for techniques enabling better detection of leaks in IV fluid bags and other types of flexible fluid containers.

SUMMARY

The present description generally relates to techniques for detecting container leakage using thermal imaging, for example, infrared imaging.

In accordance with an aspect, there is provided a method of detecting leakage from a liquid-holding container, the method including:
sensing thermal radiation emanating from a scene encompassing the liquid-holding container;
generating a thermal image of the scene based on the sensed thermal radiation; and
analyzing the thermal image, the analyzing including assessing whether the thermal image includes a thermal feature indicative of a presence of leaked liquid outside the liquid-holding container, and, if the thermal image includes such a thermal feature, determining that a leak exists in the liquid-holding container.

In some embodiments, the sensed thermal radiation includes infrared radiation. For example, the infrared radiation may include long-wavelength infrared (LWIR) radiation, with a wavelength ranging from about 8 µm to about 15 µm.

In some embodiments, the method may include determining a location of the leak in the liquid-holding container based on a location of the identified thermal feature in the thermal image.

In some embodiments, the method may include displaying the thermal image on an image display device, and performing the assessing based on the displayed thermal image.

In some embodiments, the liquid-holding container may be a compressible or flexible container. In such embodiments, the method may include applying pressure to the liquid-holding container before, during, or both before and during the sensing of thermal radiation emanating from the liquid-holding container. It is appreciated that if the liquid-holding container has a leak therein, the application of sufficient pressure to the container may cause some liquid to be expelled from the container, which may facilitate its detection as a thermal feature in the thermal image.

In some embodiments, the liquid-holding container is a flexible bag. For example, in some embodiments, the liquid-holding container is an IV fluid bag holding IV fluid.

In some embodiments, the liquid-holding container is enclosed in an overwrap. The overwrap may serve to seal or protect the bag from contamination and damage. In such embodiments, the assessed thermal feature may be indicative of liquid being present in an interstitial volume defined between an outer surface of the liquid-holding container and an inner surface of the overwrap. For example, the assessed thermal feature may be indicative of a temperature or an emissivity difference, or both, between the leaked liquid and the scene.

Depending on the application, the assessment of whether the thermal image includes a thermal feature indicative of the presence of liquid outside the liquid-holding container to provide a determination of leakage includes a human assessment, a computer assessment, or a combination of human assessment and computer assessment. When the assessment is made at least partly by a human operator, the method may include a step of displaying the thermal image on an image display device. The displayed thermal image may include different colors, different intensities, or both different colors and intensities, to represent different temperatures in different regions of the scene. For example, the displayed thermal image may provide a false-color or pseudo-color representation of the sensed thermal radiation within the scene.

In some embodiments, the thermal feature assessed in the thermal image is indicative of a temperature difference between the leaked liquid and liquid still inside the liquid-holding container. For example, in some embodiments, this temperature difference may result from the leaked liquid gradually evaporating, thus causing the temperature of the remaining, nonevaporated leaked liquid to drop relative to the temperature of the liquid still inside the liquid-holding container.

In some embodiments, the method may include applying a thermal stimulation to the liquid-holding container before, during, or both before and during the sensing of thermal radiation, and the assessed thermal feature may be indicative of a thermal response of the leaked liquid to the applied thermal stimulation. Depending on the application, the thermal stimulation may involve heat transfer by thermal conduction, thermal convection, thermal radiation, or any combination thereof. For example, in one embodiment, the applied thermal stimulation may include pulsed thermal radiation, which may be applied by a flash lamp or another suitable source of thermal radiation. Depending on the application, the thermal stimulation may have a variety of spatio-temporal heating profiles.

In some embodiments, the method may include exposing the liquid-holding container to a heating or cooling source and subsequently acquiring a thermal image. In such embodiments, the thermal feature assessed in the image may be representative of a modified thermal inertia profile associated with the presence of leaked liquid in the overwrap. In some embodiments, the liquid-holding container may move sequentially past a heating or cooling source, and then a thermal imaging device. The thermal image could be a single image, or an analysis could be performed on a sequence of images to extract time-varying behavior that could provide additional information about the observed thermal features.

In some embodiments, the thermal stimulation may be applied by a background heat source, for example, a heating device located behind the liquid-holding container and maintained at a controlled temperature relative to the temperature of the liquid-holding container. In such embodiments, the thermal feature assessed in the thermal image may be representative of thermal radiation emanating from the background heat source that interacted with leaked liquid before being sensed.

In some embodiments, the method may include suspending or hanging the liquid-holding container, and allowing the leaked liquid to flow away from the liquid-holding container toward a bottom region of the interstitial volume prior to sensing the thermal radiation.

In accordance with another aspect, there is provided a method of detecting leakage in an interstitial volume defined between a liquid-holding container and an overwrap enclosing the liquid-holding container, the method including:
  sensing thermal radiation emanating from a scene encompassing the liquid-holding container and the overwrap;
  generating a thermal image of the scene based on the sensed thermal radiation; and
  analyzing the thermal image by assessing whether the thermal image includes a thermal feature indicative of liquid being present in the interstitial volume, and, if the thermal image includes such a thermal feature, determining that a leak exists in the liquid-holding container.

In some embodiments, the liquid-holding container may be an IV fluid bag, and the sensed thermal radiation may include infrared radiation, for example, LWIR radiation. In some embodiments, the IV fluid bag and its overwrap may each be made of a plastic polymer material having a relatively high LWIR transmittance, while the IV fluid contained in, and potentially leaking from, the IV fluid bag may be composed of an aqueous solution having a relatively high LWIR absorptance/emissivity. In such embodiments, LWIR radiation may pass through the IV fluid bag and the overwrap substantially unaffected, but be more strongly attenuated by the IV fluid. As a result, the IV fluid—whether inside or outside the bag—will appear darker or lighter in the thermal image. In other embodiments, the overwrap may include or be made of a thermally opaque material (e.g., a metallic coating or foil) and the exterior of the overwrap may be exposed to thermal stimulation (e.g., heating or cooling) from a heat source. In such embodiments, the degree of heating or cooling of the opaque overwrap depends on the thermal inertia of its exposed surface, so that regions of the overwrap in contact with leaked liquid may appear darker or lighter in the thermal image upon thermal diffusion of the absorbed heat into the contacted leaked liquid.

In accordance with another aspect, there is provided an inspection system for detecting leakage from a liquid-holding container. The inspection system may include a thermal imaging device configured to sense thermal radiation emanating from a scene encompassing the liquid-holding container, and to generate a thermal image of the scene based on the sensed thermal radiation. The inspection system may also include a control and processing unit operatively connected to the thermal imaging device and configured to analyze the thermal image by assessing whether the thermal image includes a thermal feature indicative of a presence of leaked liquid outside the liquid-holding container to provide a determination that a leak exists in the liquid-holding container. Alternatively, or additionally, the control and processing unit may be configured to supply the thermal image generated by the thermal imaging device to an image display device for leakage assessment by an operator.

In some embodiments, the thermal imaging device includes an infrared camera.

In some embodiments, the control and processing unit may be configured to assess whether the thermal feature is indicative of the leaked liquid being present in an interstitial volume defined between the liquid-holding container and an overwrap enclosing the liquid-holding container.

In some embodiments, the inspection system may include an image display device configured to display the thermal image generated by the thermal imaging device.

In some embodiments, the inspection system may include a heat source, for example, a thermal radiation source, configured to apply a thermal stimulation to the liquid-holding container before, during, or both before and during the sensing of thermal radiation by the thermal imaging device. In such embodiments, the control and processing unit may be configured to assess whether the thermal feature is indicative of a thermal response of the leaked liquid to the applied thermal stimulation. In some embodiments, the liquid-holding container may be enclosed in a thermally opaque overwrap, and the heat source may be configured to apply the thermal stimulation to an exterior of the thermally opaque overwrap. The thermal imaging device may be configured to generate the thermal image as a representation of a temperature distribution at the exterior of the thermally opaque overwrap. The control and processing unit is configured to assess whether the thermal feature is representative of a thermal spot in the temperature distribution indicative of the leaked liquid being present in an interstitial volume defined between the liquid-holding container and the thermally opaque overwrap.

In some embodiments, the inspection system includes a holding fixture configured to suspend the liquid-holding container for allowing leaked liquid to flow away from the liquid-holding container toward a bottom region of the interstitial volume.

In accordance with another aspect, there is provided a non-transitory computer readable storage medium having computer executable instructions stored thereon that, when executed by a processor, cause the processor to perform various steps of the methods described herein. Such steps may include making an assessment as to whether a thermal image includes a thermal feature indicative of liquid being present outside a liquid-holding container to provide a determination of the existence of a leak in the liquid-holding container.

In accordance with another aspect, there is provided a computer device for use with or within an inspection system such as described herein. The computer device may include a processor and a non-transitory computer readable storage medium operatively coupled to the processor and having computer readable instructions stored thereon that, when executed by a processor, cause the processor to perform various steps of the methods described herein, such as noted above.

It is appreciated that other method and process steps may be performed prior to, during, or after the steps described herein. The order of one or more steps may also differ, and some of the steps may be omitted, repeated, and/or combined, depending on the application. It is also appreciated that some steps may be performed using various image analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
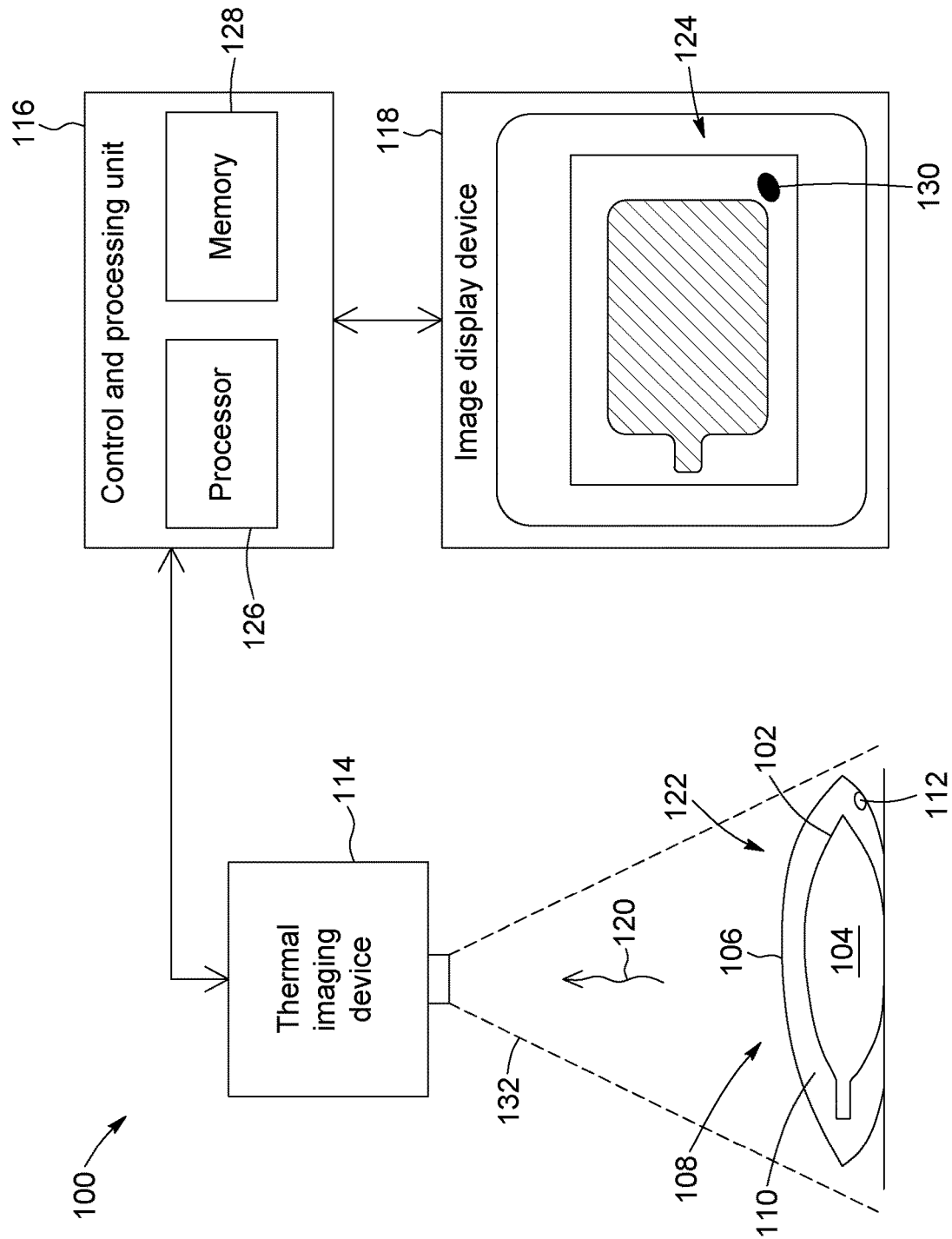
FIG. 1 is a schematic representation of an inspection system for detecting leakage from a liquid-holding container, in accordance with a possible embodiment.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It is appreciated that such spatially relative terms are intended to encompass different orientations in the use or operation of the present embodiments, in addition to the orientations exemplified in the figures.

The terms "a", "an", and "one" are defined herein to mean "at least one", that is, these terms do not exclude a plural number of elements, unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise.

The term "based on" as used herein is intended to mean "based at least in part on", whether directly or indirectly, and to encompass both "based solely on" and "based partly on". In particular, the term "based on" could also be understood as meaning "depending on", "representative of", "indicative of", "associated with", and the like.

The terms "match", "matching", and "matched" refer herein to a condition in which two elements are either the same or within some predetermined tolerance of each other. That is, these terms are meant to encompass not only "exactly" or "identically" matching the two elements but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The present description generally relates to a method for detecting container leakage using thermal or infrared imaging, notably liquid container leakage, and to an inspection system capable of implementing the method. The present techniques may be used or implemented in various inspection fields and applications, for example, medical applications, pharmaceutical applications, and applications in food industry, that require or may benefit from improved leakage monitoring and detection capabilities.

One embodiment of the leakage detection method may include a step of sensing thermal radiation emanating from a scene encompassing a liquid-holding container or a portion thereof, and a step of generating a thermal image of the scene based on the sensed thermal radiation. The method may also include a step of assessing whether the thermal image includes one or more thermal features indicative of liquid being present outside the liquid-holding container to provide a determination that a leak exists in the liquid-holding container. In some embodiments, the sensed thermal radiation includes infrared radiation, for example, long-wavelength infrared (LWIR) radiation. The liquid-holding container may be a flexible bag, for example, an IV fluid bag. In some embodiments, the liquid-holding container is packaged or enclosed in an overwrap to protect the bag from contamination and damage. In such embodiments, the assessed thermal feature may be indicative of the presence of liquid in an interstitial volume defined between the outer surface of the liquid-holding container and the inner surface of the overwrap.

The terms "light" and "optical", and variants and derivatives thereof, refer herein to radiation in any appropriate region of the electromagnetic spectrum, and are not limited to visible light. By way of example, in some embodiments, the terms "light" and "optical" may encompass electromagnetic radiation with a wavelength ranging from about 0.7 to 1000 μm. Infrared radiation is commonly divided into various regions. One common division scheme defines the near-infrared (NIR) region for wavelengths ranging from 0.7 and 1.4 μm; the short-wavelength infrared (SWIR) region for wavelengths ranging from 1.4 to 3 μm; the mid-wavelength infrared (MWIR) region for wavelengths ranging from 3 to 8 μm; the long-wavelength infrared (LWIR) region for wavelengths ranging from 8 to 15 μm; and the far-infrared (FIR) region for wavelengths ranging from 15 to 1000 μm. It is appreciated that the definitions of different infrared regions in terms of spectral ranges, as well as their limits, may vary depending on the technical field under consideration, and are not meant to limit the scope of application of the present techniques. For example, the LWIR region is sometimes defined as encompassing wavelengths ranging from 7 to 14 μm. It is also appreciated that although some embodiments of the present techniques may be useful in applications involving infrared radiation, other embodiments may additionally or alternatively operate in other regions of the electromagnetic spectrum, for example, in the terahertz region.

The term "thermal imaging", and variants and derivatives thereof, refers herein to an imaging technique in which electromagnetic radiation emanating from objects in a viewed scene is detected and processed to output a thermal image representative of a spatial temperature distribution within the scene. Thermal imaging typically operates in the infrared portion of the electromagnetic spectrum, notably in the MWIR and LWIR regions, where the radiation emitted from an object is a function of the object's temperature and emissivity. The term "thermal imaging device", and variants and derivatives thereof, such as "thermal imager" and "thermal camera", refer herein to non-contact imaging devices configured to sense thermal radiation emitted from objects present in a scene. These imaging devices can use a single thermal detector or multiple thermal detectors, for example, arranged in a linear or matrix array. The thermal detectors are configured to convert the sensed thermal radiation into electrical signals on a per-pixel basis and output a thermal image of the scene that can be put in the form of an array of pixels. Each pixel is associated with a corresponding thermal detector and has a pixel value representative of the amount of thermal energy emitted, transmitted, and reflected by a corresponding region of the scene. A thermal image can provide a temperature map of the scene within a particular spectral band. Thermal images can be displayed as single images, sequences of images, or video streams.

Depending on the application, the present techniques can rely on various types of thermal imaging devices, which can be either cooled or uncooled and use either passive or active thermography. In some embodiments, the thermal imaging device can be a passive thermal camera including an array of uncooled thermal detectors. Non-limiting examples of uncooled thermal detectors include, to name a few, bolometers and microbolometers, thermopiles, thermocouples, Golay cells, pyroelectric detectors, and ferroelectric detectors. In other embodiments, the thermal imaging device can include a single thermal detector paired with a one-dimensional or two-dimensional scanning device to create a thermal image. It is appreciated that the use of the term "thermal" refers herein to the fact that the operation of thermal imaging devices such as disclosed herein involves the conversion of electromagnetic radiation into heat. In particular, the term "thermal" does not mean that the thermal radiation detectors disclosed herein are limited to detecting "thermal radiation", which is a term whose scope is sometimes limited to infrared radiation. That is, the terms "thermal imaging" and "infrared imaging" may, but not always, be used interchangeably.

The terms "leak" and "leakage", and variants and derivatives thereof, refer herein to an unwanted or unintended escape or release of fluid or liquid out of its container. The occurrence of leaks may have various causes, such as aging, wear, damage, deterioration, faulty manufacturing or handling, exposure to adverse environmental conditions, or a combination thereof.

The term "liquid" refers herein to a substance having a definite volume and the ability to flow and to conform to the shape of its container. It is appreciated that the term "liquid" is meant to encompass fluid substances of various viscosities. Depending on the application, the term "liquid" can refer to a pure substance (e.g., water), a homogeneous solution containing one or more solutes dissolved in a solvent, a heterogeneous suspension, dispersion, emulsion, or multi-phase mixture, a cream, a gel, a paste, and the like. In some instances, the terms "liquid" and "fluid" may be used interchangeably. It is appreciated that the present techniques are not necessarily limited to the detection of liquid leakage. For example, it is envisioned that the present techniques may be used to detect the presence of leaked gases (e.g., detected using multispectral infrared imaging) or leaked solids (e.g., powder materials) in the interstitial volume between the container and its overwrap. In some implementations, the leaking liquid to be detected can be an IV fluid. The term "IV fluid" refers herein to any fluid that can be infused, transfused, or otherwise injected into a human or animal body. Non-limiting examples of IV fluids include, to name a few, volume expanders such as crystalloids (e.g., normal saline solutions, Ringer's solutions, IV sugar solutions) and colloids; blood and blood-based products; blood substitutes; medications and drugs; buffer solutions; parenteral nutrition fluids; and various other artificial solutions and additives that can be injected into the circulatory system of a patient during medical treatment.

The terms "fluid container" and "liquid container", and variants and derivatives thereof, are intended to refer to any vessel or recipient configured to hold, store, and/or transport a fluid or liquid, and which can be inspected for leaks according to the present techniques. Depending on the application, the container may be made of various materials, for example, plastic materials, and have various shapes, sizes, colors, optical properties, and configurations. In some implementations, the container can be a flexible container, such as a bag or a pouch. Common examples of flexible containers are IV fluid bags for use in medical applications. IV fluid bags are typically made of a plastic polymer material, for example, a polyvinyl polymer, which can be susceptible to tearing, puncture, breakage, or other forms of degradation. To protect their physical integrity, IV fluid bags can be contained in an overwrap, for example, made of a stronger plastic polymer, such as high-density polyethylene (HDPE). For overwrapped IV fluid bags, leaking fluid will accumulate in the interstitial volume between the bag and its overwrap. As noted above, the inspection of overwrapped IV fluid bags for leaks by assessing for the presence or absence of leaked fluid in the interstitial volume can be difficult and time-consuming using conventional methods.

Various implementations of the present techniques are described below with reference to the figures.

Referring to FIG. 1, there is illustrated an embodiment of an inspection system 100 for detecting leakage from a liquid-holding container using thermal imaging, for example, LWIR imaging. In the illustrated embodiment, the liquid-holding container is a sealed, flexible IV fluid bag 102 containing IV fluid 104. The IV fluid bag 102 is wrapped and sealed in a protective overwrap 106 to form an IV fluid bag assembly 108. The region between the outer surface of the IV fluid bag 102 and the inner surface of the overwrap 106 defines an interstitial volume 110, where leaked IV fluid 112 will tend to accumulate if a leak exists in the IV fluid bag 102. Leakage of IV fluid bags may be the result of tear, puncture, breakage, rupture, sealing defects, or other forms of damage to the physical integrity of the IV fluid bag 102 incurred during manufacturing, transportation, storage, or handling.

In some embodiments, the IV fluid bag 102 and the overwrap 106 may each be made of a plastic polymer material having a relatively high LWIR transmittance, while the IV fluid 104 may be made of a material having a relatively high LWIR absorptance/emissivity. For example, the IV fluid bag 102 may be made of polyvinyl chloride (PVC), while the overwrap 106 may be made of high-density polyethylene (HDPE). The IV fluid 104 may be composed of various types of aqueous solutions, non-limiting examples of which include crystalloids, colloids, blood and blood-based products, and blood substitutes. However, it is appreciated that, depending on the application, the IV fluid bag 102, the IV fluid 104, and the overwrap 106 in FIG. 1 can each have various compositions, resulting in various thermal radiative properties.

While the embodiment of FIG. 1 relates to leakage detection in IV fluid bags used in medical applications, the present techniques may be used in other medical and non-medical applications for detecting leaks in various types of liquid-holding containers filled with various types of liquids, with or without protective overwraps, and using both LWIR and non-LWIR radiation. Furthermore, depending on the application, the present techniques may be used in various inspection scenarios, non-limiting examples of which include in-line inspection operations (e.g., during production, packaging, and/or shipping) and reinspection operations (e.g., reinspection of entire lots of products after a previous inspection discovered leakage in one product). In another example, the inspection techniques disclosed herein have potential use in automated pharmacy systems, where IV fluid bags are filled and processed using robotic handing devices.

The inspection system 100 of FIG. 1 generally includes a thermal imaging device 114, a control and processing unit 116, and an image display device 118. More details regarding the structure and operation of these and other possible components of the inspection system 100 are provided below.

The thermal imaging device 114 is configured to sense thermal radiation 120 emanating from a scene 122 encompassing the IV fluid bag 102 and the overwrap 106, and to generate a thermal image 124 of the scene 122 based on the sensed thermal radiation 120. It is appreciated that the use of the term "encompassing" in this context is intended to mean that the IV fluid bag 102 and the overwrap 106 may be either fully or partially contained in the field of view of the thermal imaging device 114. The term "thermal image" as used herein may refer to a single thermal image, a plurality of thermal images, or a combined thermal image obtained by combining at least two thermal images. Various types of thermal imaging devices can be used to implement the present techniques. For example, the thermal imaging device 114 may be a thermal or infrared camera including a focal plane array (FPA) of uncooled thermal detectors, such as microbolometer detectors. Conventional uncooled microbolometer-based thermal cameras can include FPAs having hundreds of thousands to millions of pixels, with a pixel pitch of the order of 10 to 50 μm. It is appreciated that the general principles underlying the construction, operation, and applications of thermal imaging devices are known in the art and need not be described in greater detail herein.

The control and processing unit 116 generally includes a processor 126 and a memory 128. The control and processing unit 116 is operatively connected to the thermal imaging device 114 and the image display device 118 to control and coordinate, at least partly, their operation. The control and processing unit 116 may be configured to process and analyze the thermal image 124 generated by the thermal imaging device 114. The control and processing unit 116 may also be configured to supply the thermal image 124 to the image display device 118 in a suitable format for viewing by an operator. For example, the image display device 118 may display the thermal image 124 generated by the thermal imaging device 114 as a spatially resolved temperature map representative of the thermal radiation 120 sensed by the thermal imaging device 114. As can be appreciated, various types of image display devices (e.g., standalone monitors, laptop and desktop computers, televisions, smartphones, tablet computers) and display technologies (e.g., liquid crystal display, light-emitting diode, organic light-emitted diode, plasma) may be used depending on the application.

Depending on the application, the assessment of whether the thermal image 124 includes a thermal feature 130 indicative of the presence of IV fluid 112 outside the IV fluid bag 102 to provide a determination of leakage is a human assessment, a computer assessment, or a combination of human assessment and computer assessment.

When leakage assessment is made at least partly by a computer, the control and processing unit 116 may be configured to receive the thermal image 124 generated by the thermal imaging device 114 and analyze the thermal image 124 to assess whether it contains a thermal feature 130 indicative of IV fluid leakage. It is appreciated that various computer-implemented and software-based image analysis tools and techniques may be employed to identify a thermal feature indicative of fluid leakage in a thermal image. Such tools and techniques may use contrast enhancement and matching algorithms based on feature extraction and pattern recognition, and may rely on machine learning and/or artificial intelligence. When leakage assessment is made solely by the control and processing unit 116, the thermal image 124 may not be displayed to a human operator and the image display device 118 may be omitted.

In some embodiments, the control and processing unit 116 may be configured to take an action following the determination of whether a leak exists in the IV fluid bag 102 under inspection. For example, when the determination indicates a leak, the action taken may include sending an alert to notify the operator of the existence of the leak and/or generating commands to have the leaking IV fluid bag 102 discarded.

When leakage assessment is made at least partly by a human operator, the image display device 118 is configured to display the thermal image 124 in a format suitable for viewing and analysis by the human operator.

The control and processing unit 116 may be provided within one or more general purpose computers and/or within any other suitable computing devices implemented in hardware, software, firmware, or any combination thereof, and connected to other components of the inspection system 100 via appropriate wired and/or wireless communication links and ports. As the case may be, the control and processing unit 116 may be fully or partly integrated with or physically separate from the other components of the inspection system 100. The processor 126 may implement operating systems, and may be able to execute computer programs, also generally known as commands, instructions, functions, processes, software codes, executables, applications, and the like. The term "processor" should not be construed as being limited to a single processor, and accordingly, any known processor architecture may be used. Depending on the application, the processor 126 may include a single processing entity or a plurality of processing entities. Such processing entities may be physically located within the same device, or the processor 126 may represent the processing functionalities of a plurality of devices operating in coordination. Accordingly, the processor 126 may include or be part of: a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and operate collectively as a processor.

The memory 128, which can also be referred to as a "computer readable storage medium" is capable of storing computer programs and other data to be retrieved by the processor 126. The terms "computer readable storage medium" and "computer readable memory" are intended to refer herein to a non-transitory and tangible computer product that can store and communicate executable instructions for the implementation of various steps of the methods disclosed herein. The computer readable memory may be any computer data storage device or assembly of such devices, including a random-access memory (RAM); a dynamic RAM; a read-only memory (ROM); an erasable programmable ROM (EPROM); a magnetic storage device, such as a hard disk drive, a solid-state drive, a floppy disk, and a magnetic tape; an optical storage device, such as a compact disc (e.g., a CD or CDROM), a digital video disc (DVD), and a Blu-Ray™ disc; a flash drive memory; and/or other non-transitory memory technologies. A plurality of such storage devices may be provided, as can be appreciated by those skilled in the art. The computer readable memory may be associated with, coupled to, or included in a computer or processor configured to execute instructions contained in a computer program stored in the computer readable memory and relating to various functions associated with the computer or processor.

It is appreciated that while the embodiment of FIG. 1 depicts the thermal imaging device 114, the control and processing unit 116, and the image display device 118 as three standalone components, this need not be the case in other embodiments. For example, in some embodiments, two or all of these three components may be provided in an integrated device.

In operation, the inspection method may include a step of placing the IV fluid bag assembly 108 in the field of view 132 of the thermal imaging device 114, a step of using the thermal imaging device 114 to sense thermal radiation 120 emanating from within the field of view 132 (including thermal radiation emanating from the IV fluid bag assembly 108), and a step of generating a thermal image 124 based on the sensed thermal radiation 120. In some embodiments, the IV fluid bag assembly 108 may be placed on a conveyor, a table, a bin, or another type of mobile or stationary inspection unit. In other embodiments, a holding or supporting structure or fixture may be provided to hold the IV fluid bag assembly 108 to allow IV fluid 112 leaking from the IV fluid bag 102 to drain by gravity and accumulate at or near the bottom of the overwrap 106 prior to acquiring the thermal image 124 (see, e.g., FIGS. 4 and 5 below). In yet other embodiments, the IV fluid bag assembly 108 may be held by a human operator during the inspection method.

The inspection method may also include a step of applying pressure to the IV fluid bag assembly 108 before, during, or both before and during, the acquisition of the thermal image 124. It is appreciated that if the IV fluid bag 102 has a leak therein, pressing on the IV fluid bag 102 may cause IV fluid 104 contained in the IV fluid bag 102 to be released as leaked IV fluid 112 into the overwrap 106, where it can be detected in the thermal image 124 to provide a determination of the existence of the leak. It is also appreciated that pressing on the IV fluid bag 102 during the inspection method may help in assessing the location of the leak in the IV fluid bag 102 by increasing the likelihood that the leaked IV fluid 112 detected outside the IV fluid bag 102 be located close to the leak in the IV fluid bag 102.

The inspection method may further include a step of analyzing the thermal image 124. The analysis of the thermal image 124 may include assessing whether the thermal image 124 includes a thermal feature 130 indicative of the presence of IV fluid 112 outside the IV fluid bag 102, in the interstitial volume 110 between the IV fluid bag 102 and the overwrap 106. If the assessment is positive, that is, if a thermal feature 130 is found in the thermal image 124, the method may include a step of determining an existence of a leak in the IV fluid bag 102. Conversely, if the assessment is negative, that is, if a thermal feature 130 is not found in the thermal image 124, the method may include a step of determining an absence of a leak in the IV fluid bag 102. It is appreciated that depending on the application, the thermal image 124 may be analyzed for leaks upon being generated, in real-time or near real-time, or be saved in memory for later analysis.

The thermal feature 130 to be identified in the thermal image 124 may be representative of differences in radiative properties between the leaked IV fluid 112 and its environment, notably the IV fluid bag 102, the overwrap 106, and the IV fluid 104 still inside the bag 102. As noted above, typical IV fluid materials exhibit a relatively high LWIR absorptance/emissivity, while typical IV fluid bags and overwrap materials exhibit a relatively high LWIR transmittance. Due to these different radiative properties, typical IV fluids may be distinguished from typical IV fluid bags and overwrap materials in LWIR thermal images, the former typically appearing darker or lighter than the latter, depending on the relative temperatures of the fluids and background. This is illustrated in the thermal image 124 depicted in FIG. 1, where the leaked IV fluid 112 appears as a dark spot 130 against a lighter background. Furthermore, in some embodiments, the method may be used not only to detect the presence of a leak in the IV fluid bag 102, but also to convey information about the location of the leak in the IV fluid bag 102, based on the location of the identified thermal feature 130 in the thermal image 124.

In some embodiments, the IV fluid 112 that leaks from the IV fluid bag 102 will undergo some evaporation, which will cause the temperature of the remaining, nonevaporated leaked IV fluid 112 to drop relative to the temperature of the IV fluid 104 still inside the IV fluid bag 102. Thus, the leaked IV fluid 112 that accumulates in the interstitial volume 110 may appear darker in the thermal image 124 than the IV fluid 104 contained in the IV fluid bag 102, thus facilitating leakage detection. It is appreciated that this evaporative cooling process may be useful in distinguishing leaked IV fluid 112 from the IV fluid 104 in the IV fluid bag 102 in scenarios where their contributions are superimposed in the thermal image 124. For example, referring to FIG. 2, there is illustrated another embodiment of an inspection system 100 for detecting leakage from an IV fluid bag 102 using thermal imaging.

Figure 2:
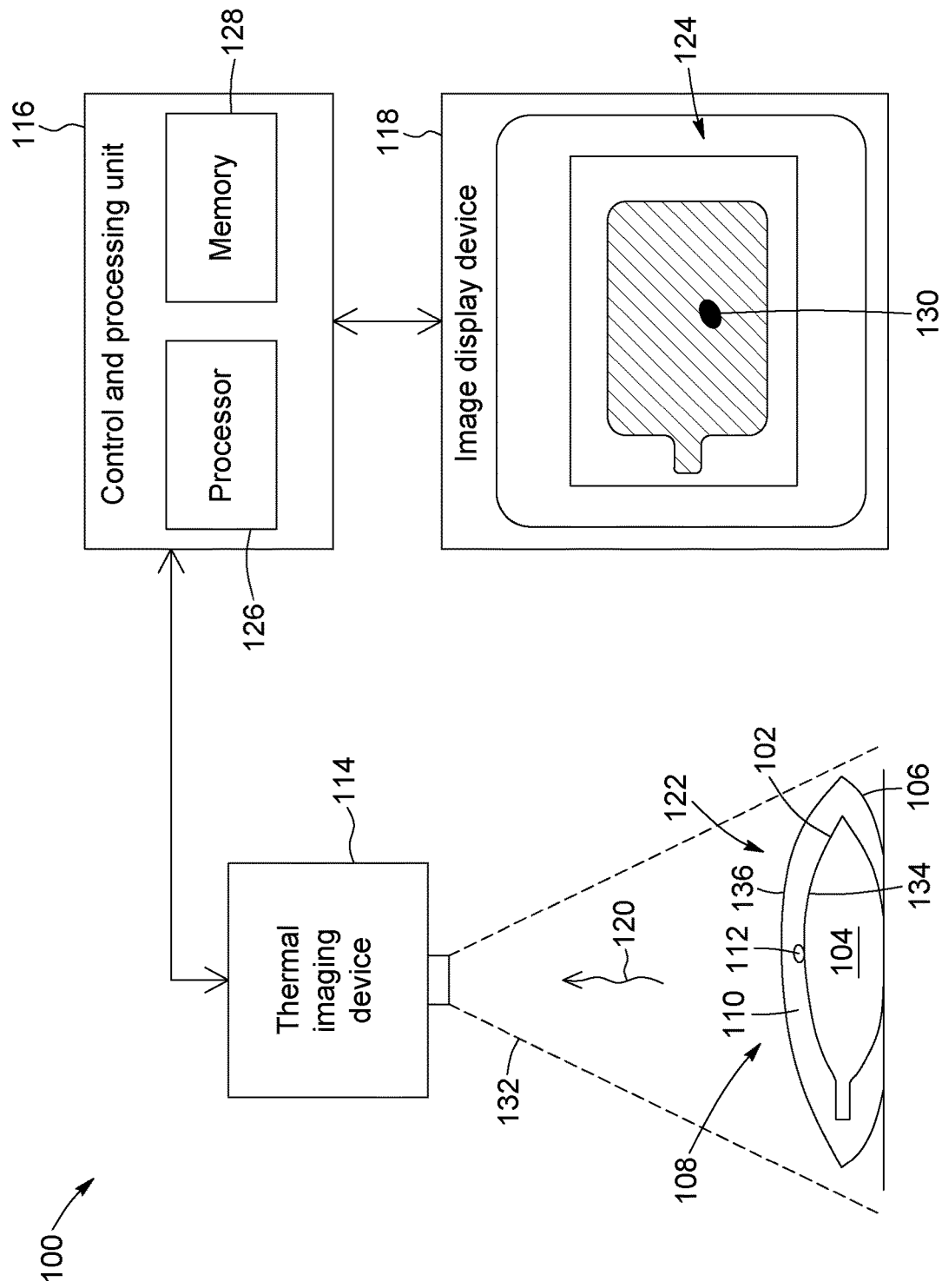
FIG. 2 is a schematic representation of an inspection system for detecting leakage from a liquid-holding container, in accordance with another possible embodiment.

The embodiment of FIG. 2 shares several features with the embodiment of FIG. 1, which will not be described again other than to highlight differences between them. The inspection system 100 of FIG. 2 includes a thermal imaging device 114 disposed to image the IV fluid bag 102 from above. In some scenarios, the IV fluid bag 102 may have a leak in its top surface, resulting in leaked IV fluid 112 accumulating in the interstitial volume 110 defined between the outer top surface 134 of the IV fluid bag 102 and the inner top surface 136 of the overwrap 106. In such scenarios, the IV fluid 112 having leaked out of the IV fluid bag 102 and the IV fluid 104 that remains in the IV fluid bag 102 are superimposed in the thermal image 124 acquired by the thermal imaging device 114. Thus, any leakage-indicative feature 130 found in the thermal image 124 may be representative, entirely or mainly, of an evaporative cooling process having induced a local temperature difference between the leaked IV fluid 112 and the IV fluid 104 still inside the IV fluid bag 102. It is noted that local temperature differences as low as 50 millikelvins may be detectable in thermal images acquired by existing thermal cameras. It is also noted that besides evaporative cooling, other endothermic and/or exothermic processes resulting in a leakage-indicative feature in the thermal image may be used to detect leaks according to the present techniques. For example, in one scenario, the leaked liquid could react chemically with gas or material (e.g., water) present in the interstitial volume to produce a detectable temperature contrast in the thermal image 124. In another scenario, the Joule-Thomson effect may be exploited to produce compression-based heating and/or expansion-based cooling resulting in a leakage-indicative feature in the thermal image 124.

Figure 3:
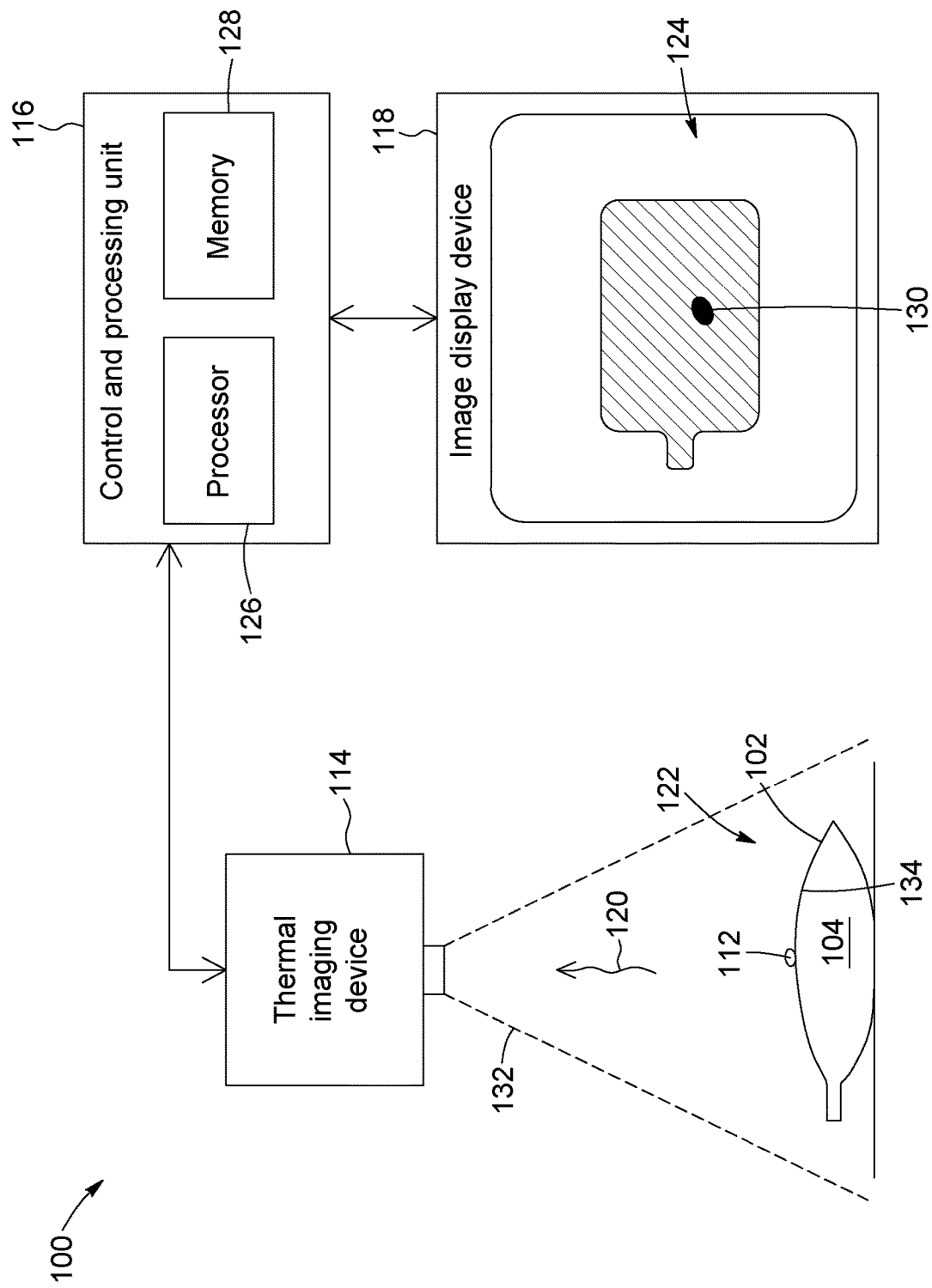
FIG. 3 is a schematic representation of an inspection system for detecting leakage from a liquid-holding container, in accordance with another possible embodiment.

Referring to FIG. 3, there is illustrated another embodiment of an inspection system 100 for detecting leakage from an IV fluid bag 102 using thermal imaging. The embodiment of FIG. 3 shares several features with the embodiments of FIGS. 1 and 2, which will not be described again other than to highlight differences between them. The embodiment of FIG. 3 is used to inspect an IV fluid bag 102 that is not contained in an overwrap. However, as in FIG. 2, the presence of leaked IV fluid 112 on the outer top surface 134 of the IV fluid bag 102 may be detected as an evaporative-cooling-induced, leakage-indicative feature 130 in the thermal image 124 acquired by the thermal imaging device 114.

Figure 4:
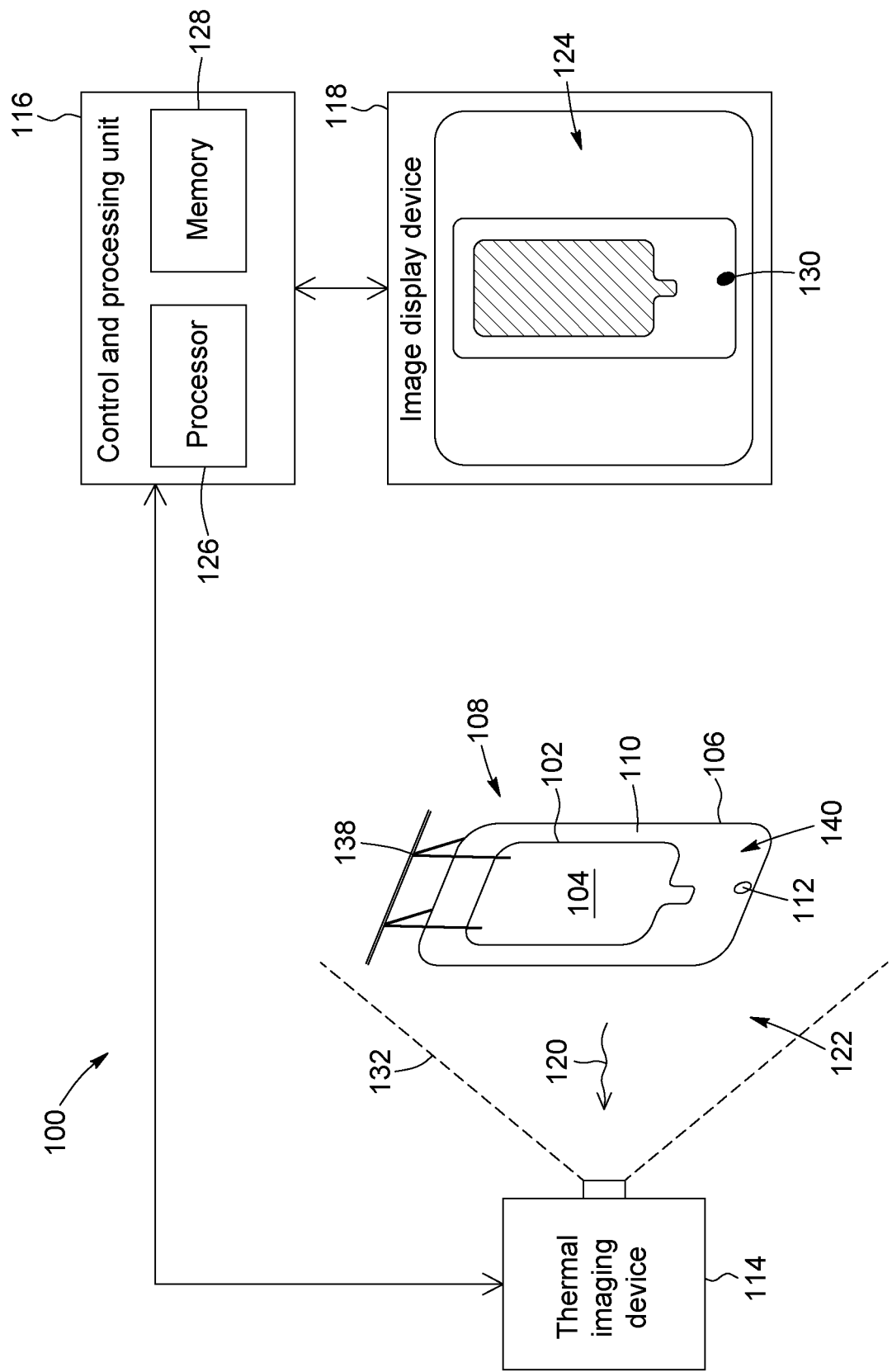
FIG. 4 is a schematic representation of an inspection system for detecting leakage from a liquid-holding container, in accordance with another possible embodiment.

Referring to FIG. 4, there is illustrated another embodiment of an inspection system 100 for detecting leakage from an IV fluid bag 102 using thermal imaging. Again, this embodiment shares several features with previously described embodiments, which will not be described again other than to highlight differences between them. In FIG. 4, the inspection system 100 includes a holding fixture 138 configured to suspend or hang the IV fluid bag assembly 108 for allowing leaked IV fluid 112 to flow downward away from the IV fluid bag 102 and accumulate in the bottom region 140 of the overwrap 106, in a space-apart relationship from the IV fluid bag 102 and the IV fluid 104 contained therein. The inspection configuration depicted in FIG. 4 may reduce or help reduce the likelihood that the response of the leaked IV fluid 112 and the response of the IV fluid 104 still inside the IV fluid bag 102 be superimposed on the thermal image 124. Thus, the identification of a leakage-indicative feature 130 in the thermal image 124 may be made against a lighter or darker background (e.g., the substantially LWIR-transparent overwrap material), rather than being based solely or mainly on the finding of an evaporative-cooling-induced temperature difference between the leaked IV fluid 112 and the IV fluid 104 still inside the IV fluid bag 102. For example, the leakage-indicative feature 130 may be indicative of a temperature or an emissivity difference, or both, between the leaked liquid 112 and the scene 122.

In some embodiments, the present techniques may use active thermography. In active thermography, an external stimulation source is used to apply a thermal stimulation (i.e., heating or cooling) to a test specimen in order to generate heat flow through the specimen. The heat flow may be affected by local variations in thermal conductivity and heat capacity inside the specimen which may be indicative of the presence of internal defects or other anomalies, such as leakage. These internal local variations may give rise to thermal spots (i.e., hot or cold spots) in the surface temperature distribution of the specimen, which may be observed in a thermal image of the test specimen during or following the application of the thermal stimulation. Depending on the application, active thermography can employ a variety of external stimulation sources (e.g., infrared and other thermal radiation sources, such as flash lamps, electrical heaters, and lasers) and stimulation techniques (e.g., pulsed thermography, lock-in thermography, step heating thermography, frequency modulated thermography, laser-spot thermography). It is appreciated that the general principles underlying the techniques and applications of active thermography are known in the art and need not be described in greater detail herein.

In embodiments using active thermography, the inspection method may include a step of applying a thermal stimulation to the liquid-holding container before, during, or both before and during, the acquisition of the thermal image, and the assessed thermal feature may be indicative of a thermal response of the leaked liquid resulting from the applied thermal stimulation. It is appreciated that the thermal stimulation is applied indirectly or directly to the liquid-holding container, depending on whether or not the liquid-holding container is enclosed in an overwrap. In some embodiments, the thermal stimulation need not be applied by a dedicated heat source, but could be the result of a change of environment producing a change in ambient temperature. For example, a change in ambient temperature amounting to a thermal stimulation may arise when the liquid-holding container is moved from a sterilization chamber maintained at an elevated temperature to an environment at room temperature.

Figure 5:
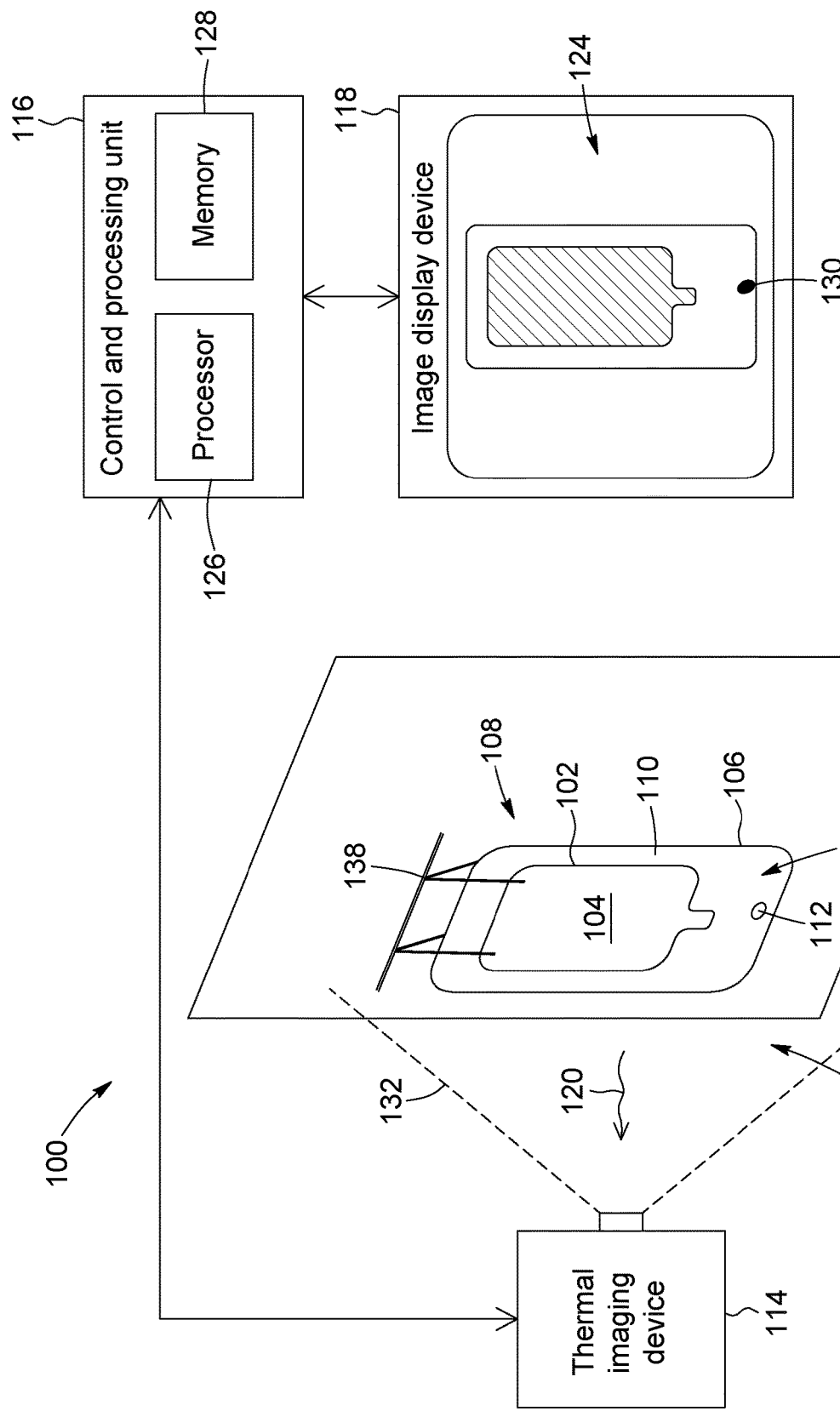
FIG. 5 is a schematic representation of an inspection system for detecting leakage from a liquid-holding container, in accordance with another possible embodiment.

Referring to FIG. 5, there is illustrated an embodiment of an inspection system 100 for detecting leakage from an IV fluid bag 102 using active thermography. This embodiment shares several features with previously described embodiments, which will not be described again other than to highlight differences between them. The inspection system 100 in FIG. 5 includes a heat source 142 located behind the IV fluid bag 102 in the field of view 132 of the thermal imaging device 114 and having a controlled temperature relative to the temperature of the IV fluid bag assembly 108 and its surroundings, which may be the same as the ambient temperature. The heat source 142 may include a heating device, such as a heating plate or surface. For example, in one variant, the background heat source 142 may be embodied by a black- or dark-painted sheet made of aluminum or another metal and filling partly or completely the field of view 132 of the thermal imaging device 114. To improve contrast, the sheet may be maintained at a controlled temperature cooler or warmer (e.g., by one or a few degrees Celsius) relative to ambient temperature, for example, using heating strip and thermocouples. In the embodiment of FIG. 5, the thermal feature 130 assessed in the thermal image 124 may be representative of thermal radiation emitted by the background heat source 142 that interacted with the leaked IV fluid 112 (e.g., by processes of transmission, reflection, and absorption/reemission) prior to being sensed by the thermal imaging device 114. To this end, the temperature at which the background heat source 142 is maintained and/or its separation from the IV fluid bag 102 under inspection may be selected to enhance a contrast between thermal features indicative of IV fluid leakage and other thermal features in the thermal image 124. It is also appreciated that the background heat source 142 may, but need not, be maintained at a same temperature over its surface area. In particular, the background heat source may be used to produce spatially-varying temperature fields or gradients to further enhance the contrast of leakage-indicative features in thermal images. It is also appreciated that, depending on the application, the temperature of the background heat source 142 may be constant or may vary as a function of time.

Figure 6A:
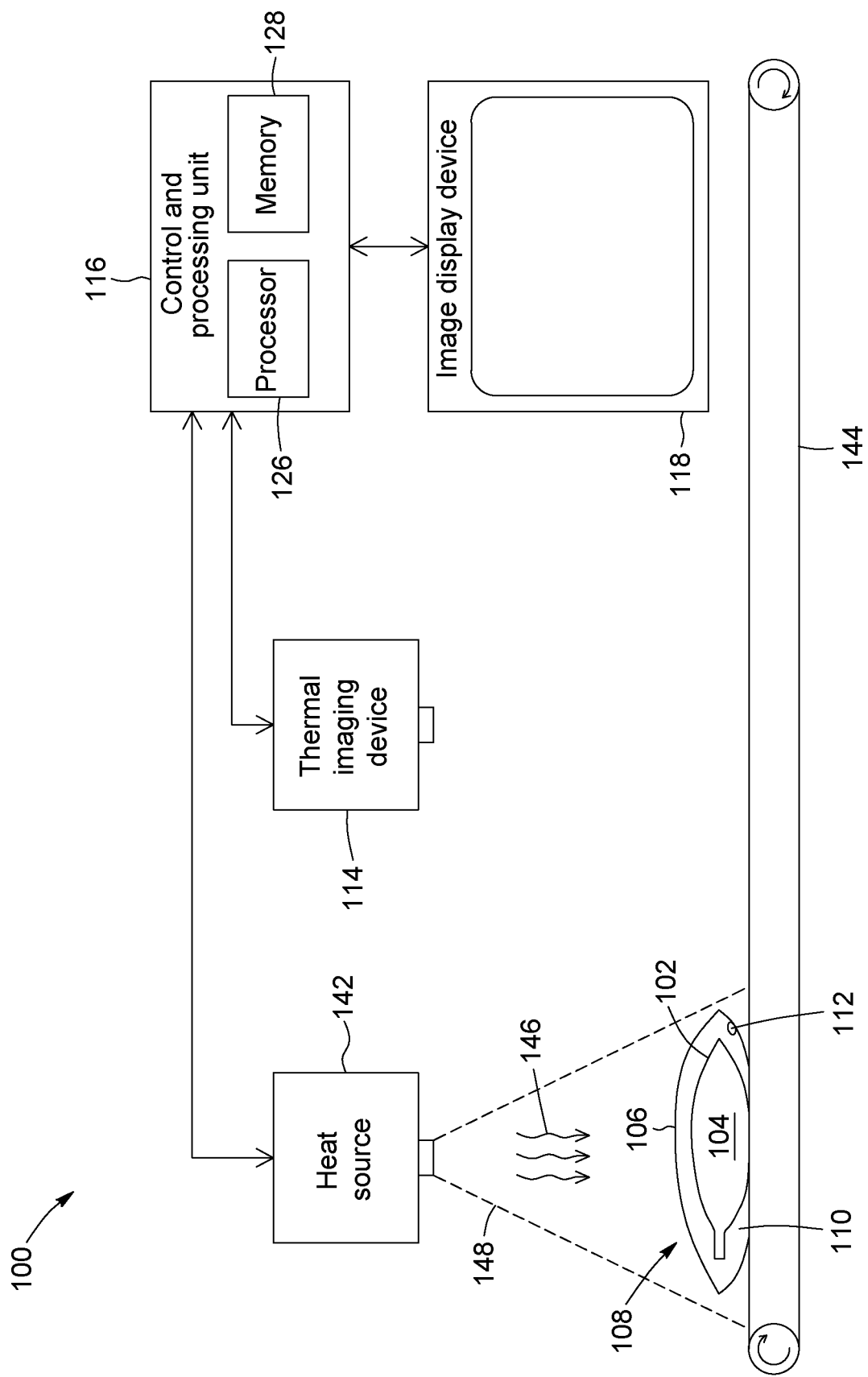
FIGS. 6A and 6B are schematic representations of two operation phases of an inspection system for detecting leakage from a liquid-holding container, in accordance with another possible embodiment.
Figure 6B:
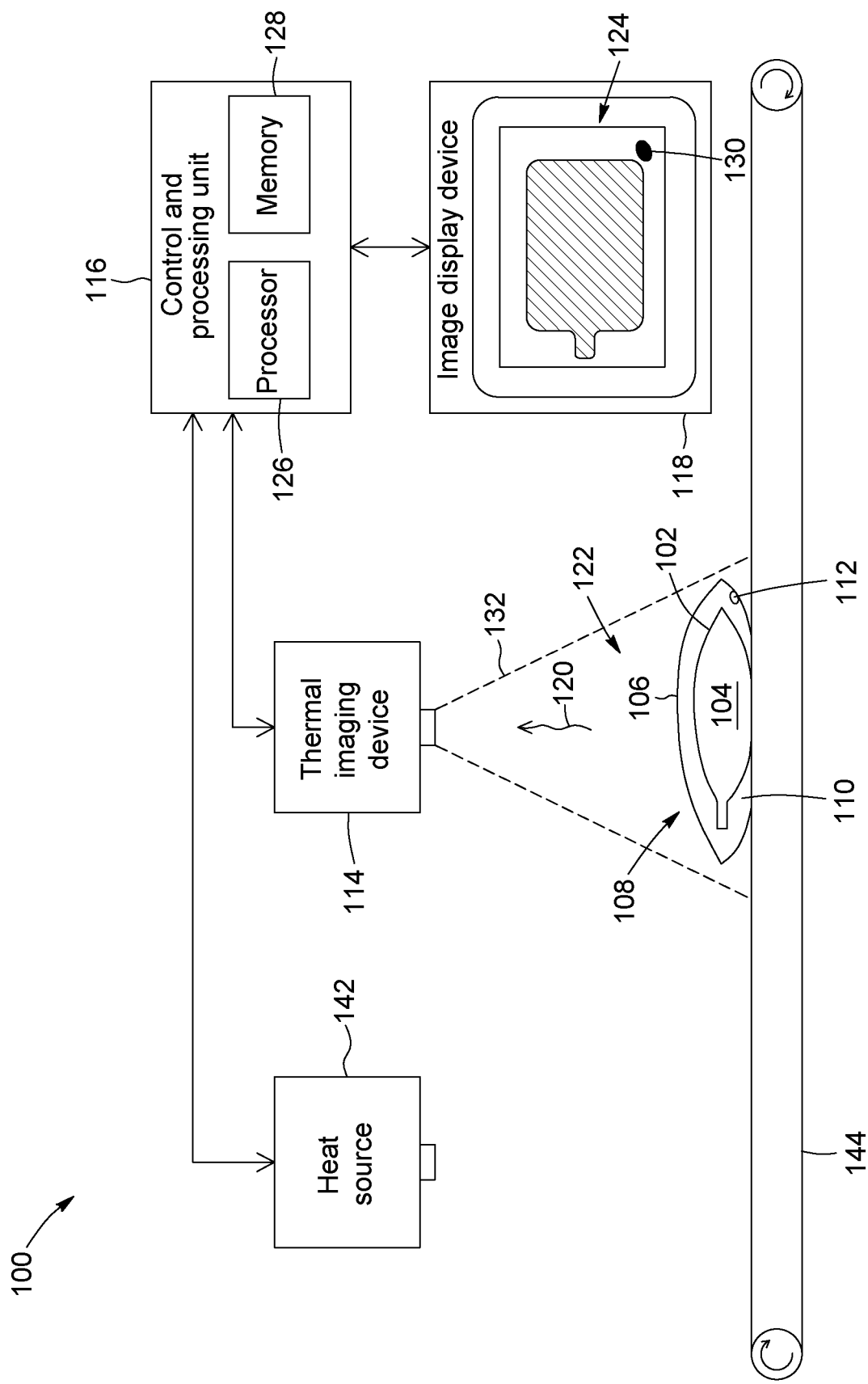

Referring to FIGS. 6A and 6B, there is illustrated another embodiment of an inspection system 100 for detecting leakage from an IV fluid bag 102 using active thermography. This embodiment shares several features with previously described embodiments, which will not be described again other than to highlight differences between them. The inspection system 100 of FIGS. 6A and 6B generally includes a heat source 142, a thermal imaging device 114, an image display device 118, a control processing unit 116, and a conveyor 144. The IV fluid bag 102 is enclosed in an overwrap 106 to form an IV fluid bag assembly 108. The IV fluid bag assembly 108 is transported on the conveyor 144 to be sequentially excited by the heat source 142 (FIG. 6A) and imaged by the thermal imaging device 114 (FIG. 6B).

In FIG. 6A, the heat source 142 is configured to apply a thermal stimulation 146 to the IV fluid bag assembly 108 within a field of illumination 148. The thermal stimulation 146 may be a heating or a cooling stimulation, and the field of illumination 148 of the heat source 142 may have various sizes and shapes. Furthermore, it is appreciated that a variety of heat sources and thermal stimulation techniques are available for active thermography and may be used to implement the present techniques. In addition to those mentioned above, non-limiting examples of heat sources can include, to name a few, heated or cooled darkened metallic plates and quartz tungsten halogen (QTH) lamps. In some embodiments, the thermal stimulation 46 may be applied for a time duration of the order of tens of milliseconds to a few seconds. In FIG. 6B, the thermal imaging device 114 is configured to sense thermal radiation 120 emanating from the scene 122 encompassing the IV fluid bag 102 and generate a thermal image 124 of the scene 122 based on the sensed thermal radiation 120. The thermal image 124 may be displayed on the image display device 118. Depending on the application, an appropriate delay may be controlled between the application of the thermal stimulation 146 and the acquisition of the thermal image 124 to allow heat transfer to the leaked liquid 112 before imaging. The thermal image 124 may be analyzed by human and/or computer assessment to determine whether it includes a thermal feature 130 indicative of a thermal response of leaked liquid 112 resulting from the applied thermal stimulation 146.

In some embodiments, the overwrap 106 may be made of a thermally opaque material, for example, a metallic coating or foil. The term "thermally opaque" is used herein to refer to a material that prevents or substantially prevents transmission of thermal radiation (e.g., infrared radiation, notably in the LWIR region) therethrough. In such embodiments, the thermal stimulation 146 may be applied to an exterior of the thermally opaque overwrap 106 and the thermal image generated by the thermal imaging device 114 may be representative of a temperature distribution at the exterior of the overwrap 106. The assessed thermal feature 130 may be representative of a thermal spot in the temperature distribution that is indicative of leaked liquid 112 being present in the interstitial volume 110 defined between the IV fluid bag 102 and the overwrap 106. In this case, the degree of heating or cooling of the thermally opaque overwrap 106 may depend on the thermal inertia of its exposed surface, so that regions of the overwrap 106 in contact with leaked liquid 112 may appear darker or lighter in the thermal image 124.

Such embodiments are based on the principle that heat flow generated through the overwrap 106 following the application of the thermal stimulation 146 by the heat source 142 may be affected by the presence of leaked liquid 112 inside the overwrap 106. These changes in heat flow may cause localized differences in the temperature map of the overwrap 106, which may be observed as thermal features 130 (e.g., hot or cold spots) in the thermal image 124 to provide a determination of the presence and location of liquid leakage. In some implementations, a sequence of thermal images may be acquired, for example, over a time interval of the order of tens of milliseconds to a few seconds, to study the time evolution of the surface temperature of the overwrap 106 in response to the applied the thermal stimulation 146, which may convey further information indicative of container leakage. In some cases, the sequence of thermal images may include one or more images acquired before thermal stimulation, one or more images acquired during thermal stimulation, one or more images acquired after thermal stimulation, or any combination thereof. These images may be compared to convey information about the presence of container leakage.

In accordance with another aspect of the present description, there is provided a non-transitory computer readable storage medium having computer executable instructions stored thereon that, when executed by a processor, cause the processor to perform various steps of the methods described herein.

In accordance with another aspect of the present description, there is provided a computer device for use with or in an leak inspection system such as described herein. The computer device may include a processor and a non-transitory computer readable storage medium such as described herein. The non-transitory computer readable storage medium may be operatively coupled to the processor and may have computer readable instructions stored thereon that, when executed by a processor, cause the processor to perform various steps for controlling the inspection system and/or various steps of methods described herein.

The following description reports work conducted to study and investigate some aspects of the present techniques. It is appreciated that the container leakage detection techniques described herein may have a number of optional features, variations, and applications. In particular, the following description is provided to further illustrate some aspects and capabilities of the disclosed techniques, but should not be construed as in any way limiting their scope.

Figure 7A:
FIGS. 7A and 7B are a visible-light image (FIG. 7A) and a LWIR thermal image (FIG. 7B) of an overwrapped IV fluid bag. Leaking IV fluid is not visible in FIG. 7A but is detected in FIG. 7B, as evidenced by the presence of dark spots at the bottom of the overwrap.
Figure 7B:
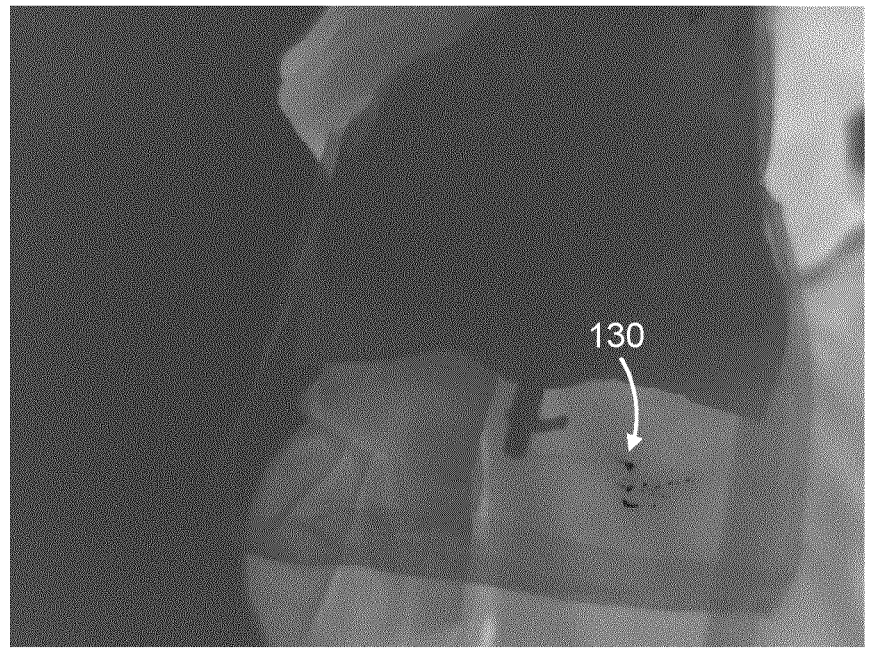

FIGS. 7A and 7B illustrate that leaking IV fluid that cannot or can hardly be detected in a visible-light image (FIG. 7A) of an overwrapped IV fluid bag may readily be detected in a LWIR thermal image 124 (FIG. 7B), as evidenced by the presence of dark spots 130 in a bottom region of the overwrap. No such dark spots are observed in FIG. 7A.

Figure 8A:
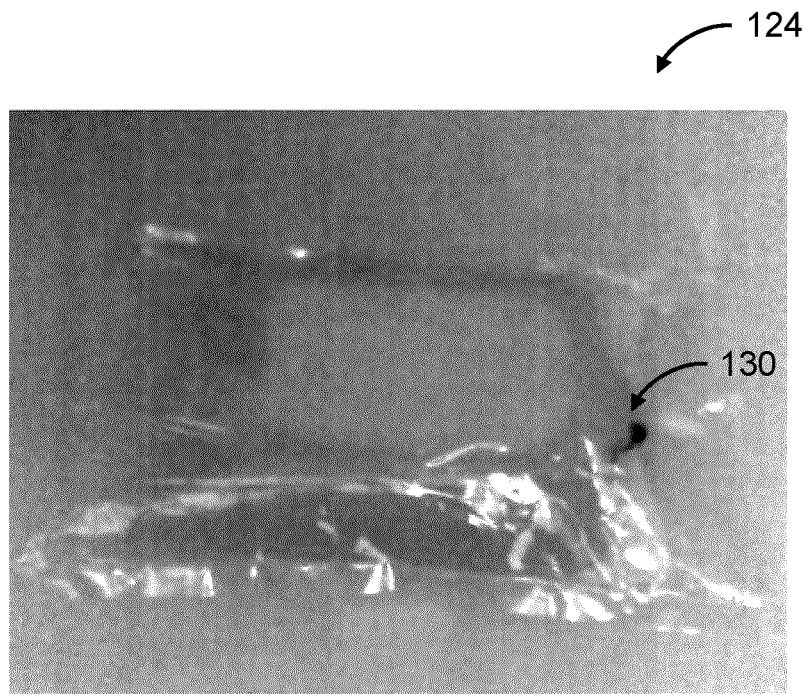
FIGS. 8A and 8B are LWIR thermal images of an IV fluid bag with (FIG. 8A) and without (FIG. 8B) leakage. The thermal image in FIG. 8A contains darker spots indicative of local temperature differences between leaked IV fluid and the IV fluid still inside the bag, the temperature differences being induced by evaporative cooling undergone by the leaked IV fluid.
Figure 8B:

FIGS. 8A and 8B are LWIR thermal images 124 of an IV fluid bag with (FIG. 8A) and without (FIG. 8B) leakage. FIG. 8A illustrates the effect on the thermal image 124 of an evaporative cooling process undergone by leaked IV fluid and inducing local temperature differences between the leaked IV fluid and the IV fluid having remained inside the IV fluid bag. The local temperature differences appear as darker thermal features 130 in the thermal image 124 that facilitate leakage detection. It is appreciated that such dark features are not observed in the thermal image 124 of FIG. 8B, corresponding to the IV fluid bag without leakage.

Figure 9C:
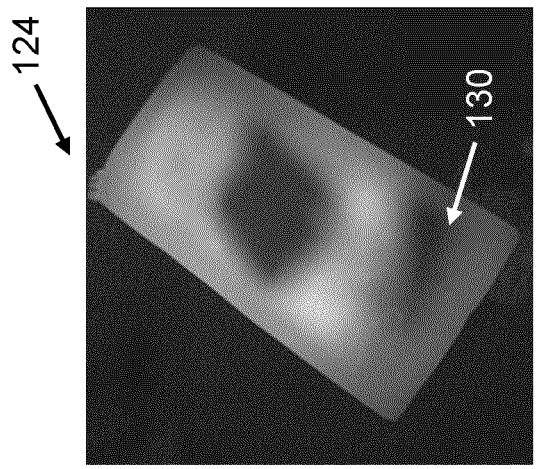
FIGS. 9A to 9C are a sequence of three LWIR thermal images of a leaking IV fluid bag enclosed in a thermally opaque overwrap. The images were acquired at different times following the application of a thermal stimulation to the overwrap.
Figure 9B:
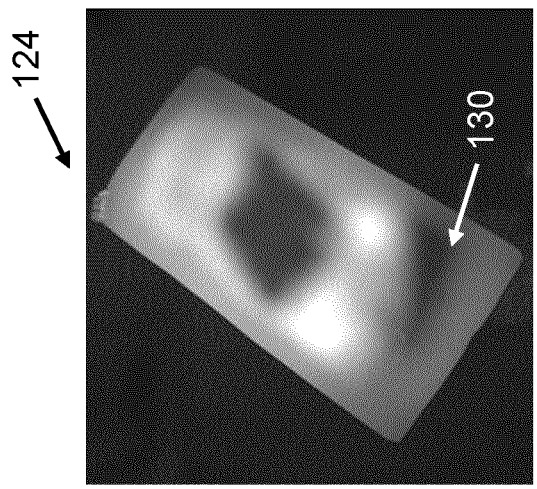
Figure 9A:
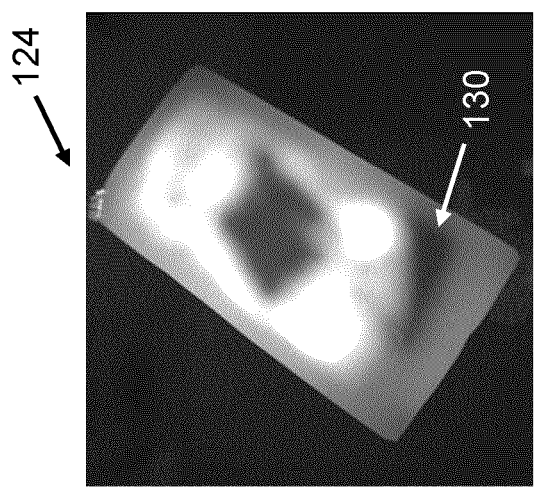

FIGS. 9A to 9C are a sequence of three LWIR thermal images 124 of a leaking IV fluid bag enclosed in a thermally opaque overwrap. The three images 124 were acquired at three different times following the application of a thermal stimulation to the overwrap in order to study the time evolution of its surface temperature in response to the thermal stimulation. The thermal stimulation was applied by a QTH lamp for about five seconds. The image acquisition began about three seconds after the end of exposure, and the three images 124 were acquired about three seconds apart. It is appreciated, as noted above, that in practical applications, the duration of the exposure to the thermal stimulation and the image acquisition process will generally be significantly shorter that in this example. As noted above, the presence of leaked liquid in the overwrap may change the heat flow generated through the overwrap by the thermal stimulation and, in turn, create local contrasts in the temperature profile of the overwrap which may be observed by thermal imaging. Each of the three images 124 features a darker region 130 indicative of leaked liquid having accumulated at the bottom of the overwrap. It is noted that the average surface temperature of the overwrap decreases from FIG. 9A to FIG. 9C.

Numerous modifications could be made to the embodiments described above without departing from the scope of the appended claims.

The invention claimed is:

1. An inspection system for detecting leakage from a liquid-holding container enclosed in an overwrap made of a material that is opaque to thermal radiation, the inspection system comprising:
   a heat source configured to apply a thermal stimulation to an exterior of the overwrap;
   a thermal imaging device configured to sense thermal radiation emanating from a scene encompassing the liquid-holding container, and to generate a sequence of thermal images of the scene based on the sensed thermal radiation, the sequence of thermal images being representative of a time evolution of a temperature distribution at the exterior of the overwrap in response to the applied thermal stimulation; and
   a control and processing unit operatively connected to the thermal imaging device and configured to analyze the sequence of thermal images by assessing whether the sequence of thermal images includes a thermal feature representative of a thermal spot in the temperature distribution and indicative of leaked liquid being present in an interstitial volume defined between the liquid-holding container and the overwrap to provide a determination that a leak exists in the liquid-holding container.

2. The inspection system of claim 1, wherein the thermal imaging device comprises an infrared camera.

3. The inspection system of claim 1, further comprising an image display device configured to display the thermal image generated by the thermal imaging device.

4. The inspection system of claim 1, further comprising a holding fixture configured to suspend the liquid-holding container for allowing the leaked liquid to flow away from the liquid-holding container toward a bottom region of the interstitial volume.

* * * * *